United States Patent
Winstanley et al.

(10) Patent No.: US 10,223,464 B2
(45) Date of Patent: Mar. 5, 2019

(54) SUGGESTING FILTERS FOR SEARCH ON ONLINE SOCIAL NETWORKS

(71) Applicant: Facebook, Inc., Menlo Park, CA (US)

(72) Inventors: Melissa Rose Winstanley, Seattle, WA (US); Evan John Rocha, Seattle, WA (US); David M. Goldblatt, San Francisco, CA (US); Brinda Mehta, San Jose, CA (US); Daniel Cabral Francisco, Menlo Park, CA (US); Krishna Jayaram Kalpathy, San Jose, CA (US); Prerna Totla, Seattle, WA (US); Eric Ringger, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 456 days.

(21) Appl. No.: 15/228,771

(22) Filed: Aug. 4, 2016

(65) Prior Publication Data
US 2018/0039647 A1 Feb. 8, 2018

(51) Int. Cl.
*G06F 17/30* (2006.01)

(52) U.S. Cl.
CPC .. *G06F 17/30867* (2013.01); *G06F 17/30864* (2013.01)

(58) Field of Classification Search
CPC ............... G06F 17/30864; G06F 17/30867
USPC .................................................... 707/767
See application file for complete search history.

(56) References Cited

U.S. PATENT DOCUMENTS

| | | | |
|---|---|---|---|
| 5,918,014 A | 6/1999 | Robinson | |
| 6,539,232 B2 | 3/2003 | Hendrey | |
| 6,957,184 B2 | 10/2005 | Schmid | |
| 7,069,308 B2 | 6/2006 | Abrams | |
| 7,379,811 B2 | 5/2008 | Rasmussen | |
| 7,539,697 B1 | 5/2009 | Akella | |
| 7,752,326 B2 | 7/2010 | Smit | |
| 7,783,630 B1 | 8/2010 | Chevalier | |
| 7,797,635 B1 | 9/2010 | Denise | |
| 7,836,044 B2 | 11/2010 | Kamvar | |
| 8,027,990 B1 | 9/2011 | Mysen | |
| 8,055,673 B2 | 11/2011 | Churchill | |
| 8,060,639 B2 | 11/2011 | Smit | |
| 8,082,278 B2 | 12/2011 | Agrawal | |
| 8,112,529 B2 | 2/2012 | Van Den Oord | |
| 8,135,721 B2 | 3/2012 | Joshi | |

(Continued)

*Primary Examiner* — Hanh B Thai

(74) *Attorney, Agent, or Firm* — Baker Botts L.L.P.

(57) ABSTRACT

In one embodiment, a method includes receiving a search query from a client system of a first user; parsing the search query into n-grams, and calculating confidence-scores for entities in a set of query-analysis-entities based on the n-grams, each confidence-score representing a probability that one or more of the n-grams are intended to reference a respective entity; determining a set of search results matching the search query, and calculating entity-frequencies corresponding to entities in a set of results-analysis-entities based on a histogram analysis of the set of search results; calculating a filter-score entities in a set of prospective-entities, which includes entities from the set of query-analysis-entities and the set of results-analysis-entities, based on the respective confidence-score and entity-frequency; and sending, to the client system, suggested filters corresponding to entities having a filter-score greater than a threshold filter-score, the suggested filters being selectable to modify the set of search results.

20 Claims, 6 Drawing Sheets

(56) References Cited

U.S. PATENT DOCUMENTS

| | | |
|---|---|---|
| 8,145,636 B1 | 3/2012 | Jeh |
| 8,180,804 B1 | 5/2012 | Narayanan |
| 8,185,558 B1 | 5/2012 | Narayanan |
| 8,209,330 B1 | 6/2012 | Covell |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 9,536,522 B1* | 1/2017 | Hall ................ G10L 15/18 |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2007/0174304 A1 | 7/2007 | Shrufi |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0240647 A1* | 9/2009 | Green ................ G06N 7/005 706/52 |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2014/0006416 A1 | 1/2014 | Leslie |

(56) References Cited

U.S. PATENT DOCUMENTS

| | | |
|---|---|---|
| 2014/0067535 A1 | 3/2014 | Rezaei |
| 2014/0122465 A1 | 5/2014 | Bilinski |
| 2014/0280080 A1 | 9/2014 | Solheim |
| 2014/0304429 A1 | 10/2014 | Softky |
| 2014/0337371 A1* | 11/2014 | Li .................. G06F 17/30958 707/767 |
| 2015/0074289 A1 | 3/2015 | Hyman |
| 2015/0161519 A1 | 6/2015 | Zhong |
| 2016/0026727 A1 | 1/2016 | Bar-Yossef |
| 2016/0048527 A1* | 2/2016 | Li .................. G06F 17/30958 707/723 |

* cited by examiner

SUGGESTING FILTERS FOR SEARCH ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may receive a search query from a first user (i.e., the querying user). The search query may be a text string or any other suitable query means (e.g., an image, an audio file, or other media item). The social-networking system may execute one or more analyses in response to receiving the search query. In particular embodiments, the social-networking system may analyze the search query by executing both a query-analysis process and a results-analysis process, which may be performed in parallel or in any suitable sequence. The query-analysis process may include translating the search query into text and parsing the text to identify one or more n-grams. The query-analysis process may also include calculating one or more confidence-scores for one or more entities (e.g., users of the online social network, concepts) in a set of query-analysis-entities, respectively. Each confidence-score may be based on an analysis of the identified n-grams. The confidence-scores may be based on one or more factors, including the number of identified n-grams from the search query that potentially reference or are otherwise associated with the respective entity. The confidence-scores may also be based on information about the first user and the respective entity (e.g., an affinity between the first user and the respective entity, a degree of separation between the first user and the respective entity). The results-analysis process, which may be an analysis of a set of search results that match the query, may include an initial determination of a set of search results matching the search query. The search results may correspond to one or more objects, respectively. Each of the one or more objects may be associated with one or more entities in a set of results-analysis-entities. The results-analysis process may also include calculating one or more entity-frequencies corresponding to one or more entities in the set of results-analysis-entities, respectively. The calculation may be based on an analysis of a histogram based on the set of search results matching the search query. Each entity-frequency may correspond to a number of occurrences of a respective entity associated with the search results on the histogram. The social-networking system may calculate a filter-score for each entity in a set of prospective-entities based on the respective confidence-score for the entity and the respective entity-frequency of the entity. The set of prospective-entities may include entities from the set of query-analysis-entities and the set of results-analysis-entities (e.g., the entities for which there is a confidence-score greater than a threshold confidence-score and an entity-frequency greater than a threshold entity-frequency). The social-networking system may send, to a client system 130 of the first user, one or more suggested filters. The suggested filters may be filters corresponding to entities having a filter-score greater than a threshold filter-score. The suggested filters may be selectable by the first user. Upon a selection by the first user to modify the set of search results based on the entity corresponding to the suggested filter. Although this disclosure focuses on determining and suggesting filters for search by and on the social-networking system, it contemplates determining and suggesting filters for search by and on any suitable search system.

The methods described herein may be used to determine and suggest filters that are effective at narrowing down a set of search results to a smaller subset of search results that may correspond to content that the querying user intended to locate with the search query (or other content that would be of interest to the querying user). In part, the described methods address a common problem associated with search queries: they are often not descriptive enough to identify exactly what the querying user is looking for. Consequently, these search queries often return a large, unwieldy set of search results that has to be manually reviewed by the querying user to locate the intended content. Implementing one or more filters may aid the querying user in narrowing down the set of search results to minimize this manual review process. As an example and not by way of limitation, the querying user may be able to implement a filter that narrows down a set of search results by specifying that only search results corresponding to objects tagged in Hawaii or otherwise associated with the concept "Hawaii" are to be displayed. However, simply presenting every possible filter to the querying user may be overwhelming or at least inconvenient for the querying user, who would need to review all the possible filters to identify the exact filters necessary to locate the intended content. A goal of the methods described herein is the suggestion of effective filters to the querying user. In order to be effective, a filter may need to be directed to narrowing a set of search results based on a predicted search intent of the querying user (e.g., an intent to locate specific content, an intent to locate any content related to a particular user or concept). The filter may also need to be able to reduce the size of the result set by a nontrivial amount (e.g., such that implementation of the filter does not return an identical or substantially identical set of search results following). Suggesting effective filters serves to assist the querying user in easily and efficiently narrowing down a set of search results. Such suggestions may be especially useful in cases where the querying user may not even have thought of using one or more particular suggested filters. As an example and not by way of limitation, the querying user may not have even thought about narrowing the search query or the set of search results to search results associated with "Hawaii" until the suggestion of a filter for "Hawaii." Presenting a set of effective filters that predict the content intended by a search query may serve to improve the querying user experience with search and may generally improve the effectiveness of user searches. The methods described herein also strive to ensure that private or semi-private information (e.g., information that is not visible to at least the querying user) is not inadvertently revealed to the querying user by the presentation of filters. In doing so, the social-networking system may check one or more privacy settings associated with the objects and entities involved.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
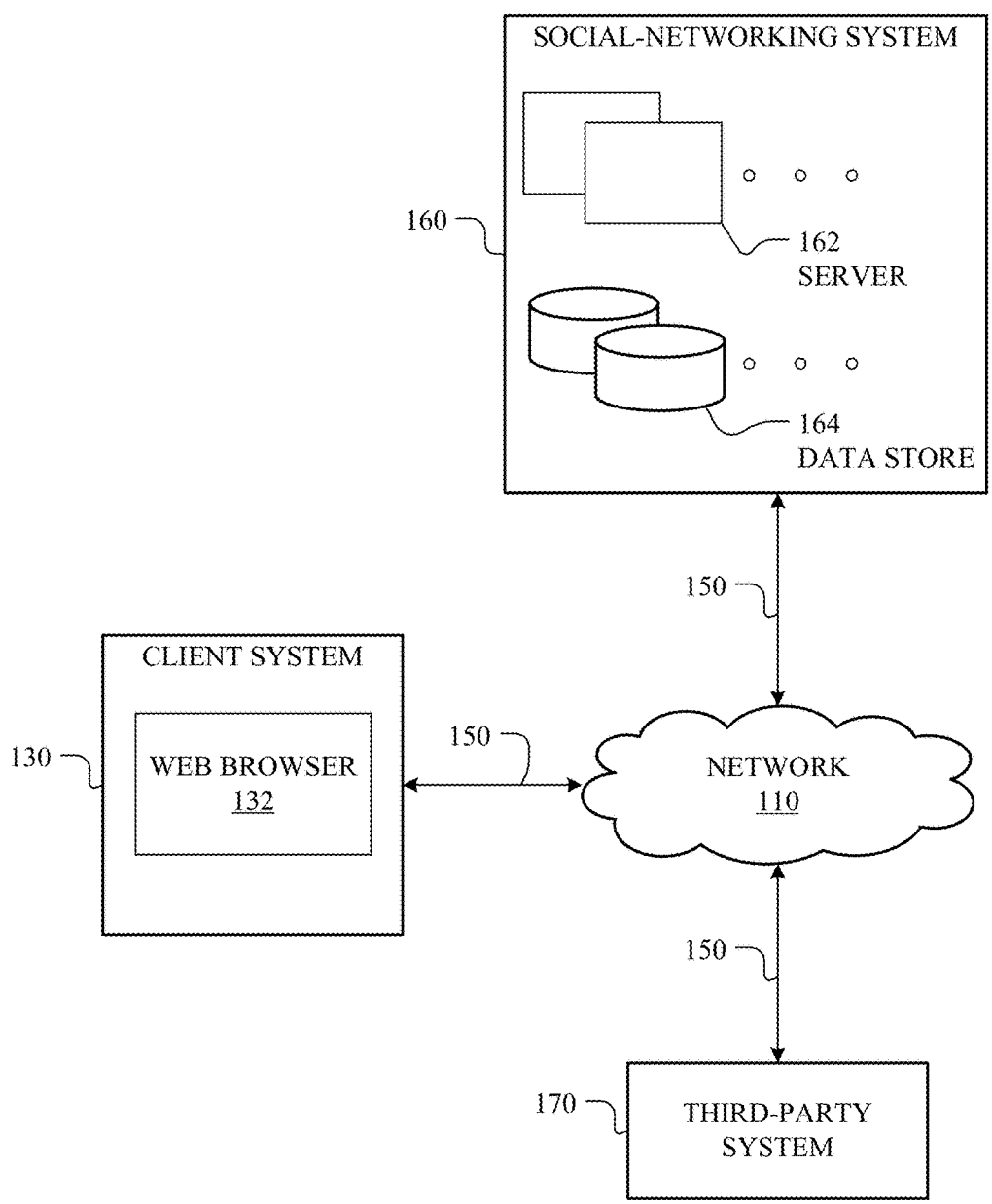
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g., a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
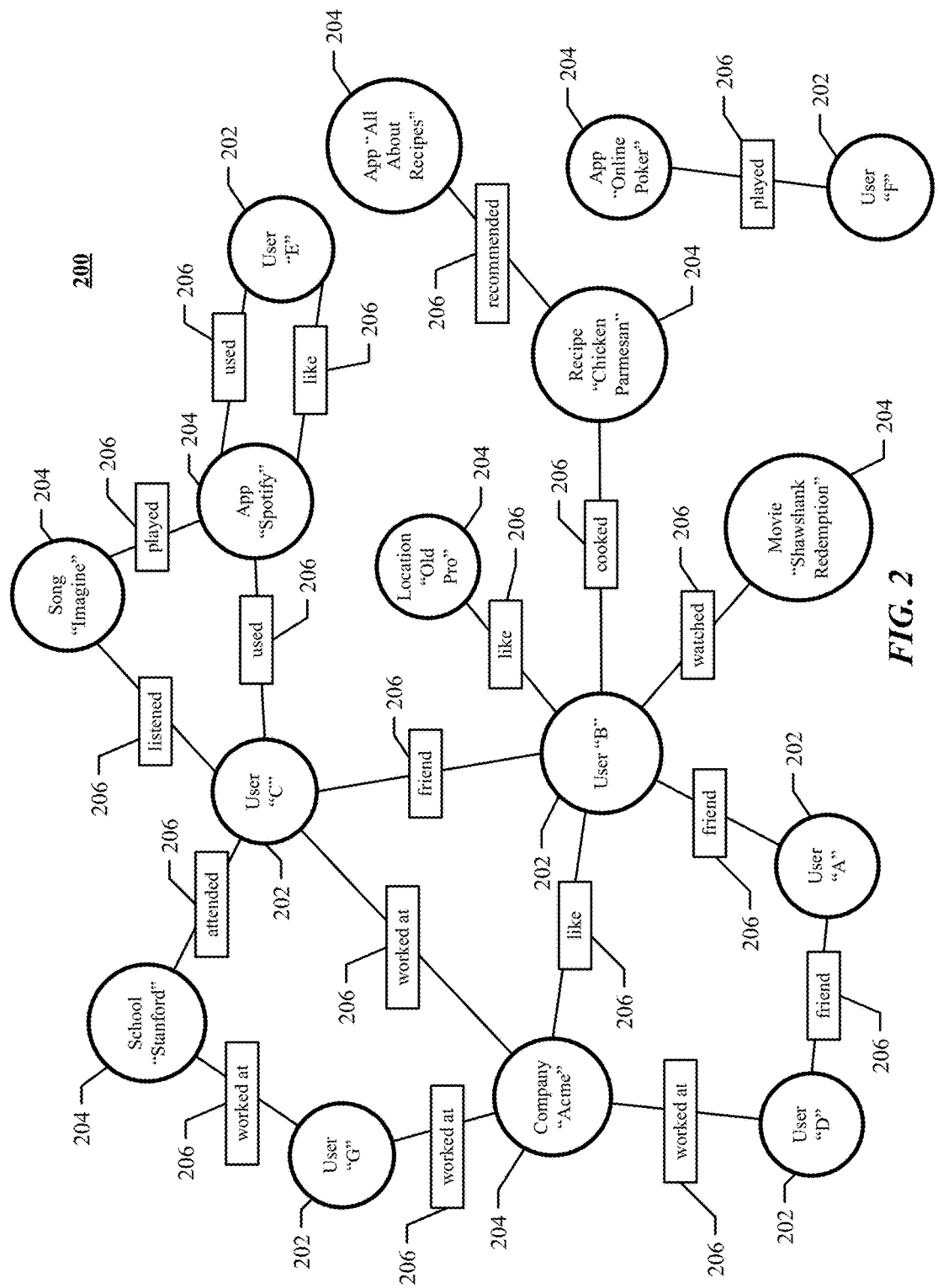
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party server 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources.

Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503, 093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Indexing Based on Object-Type

Figure 3:
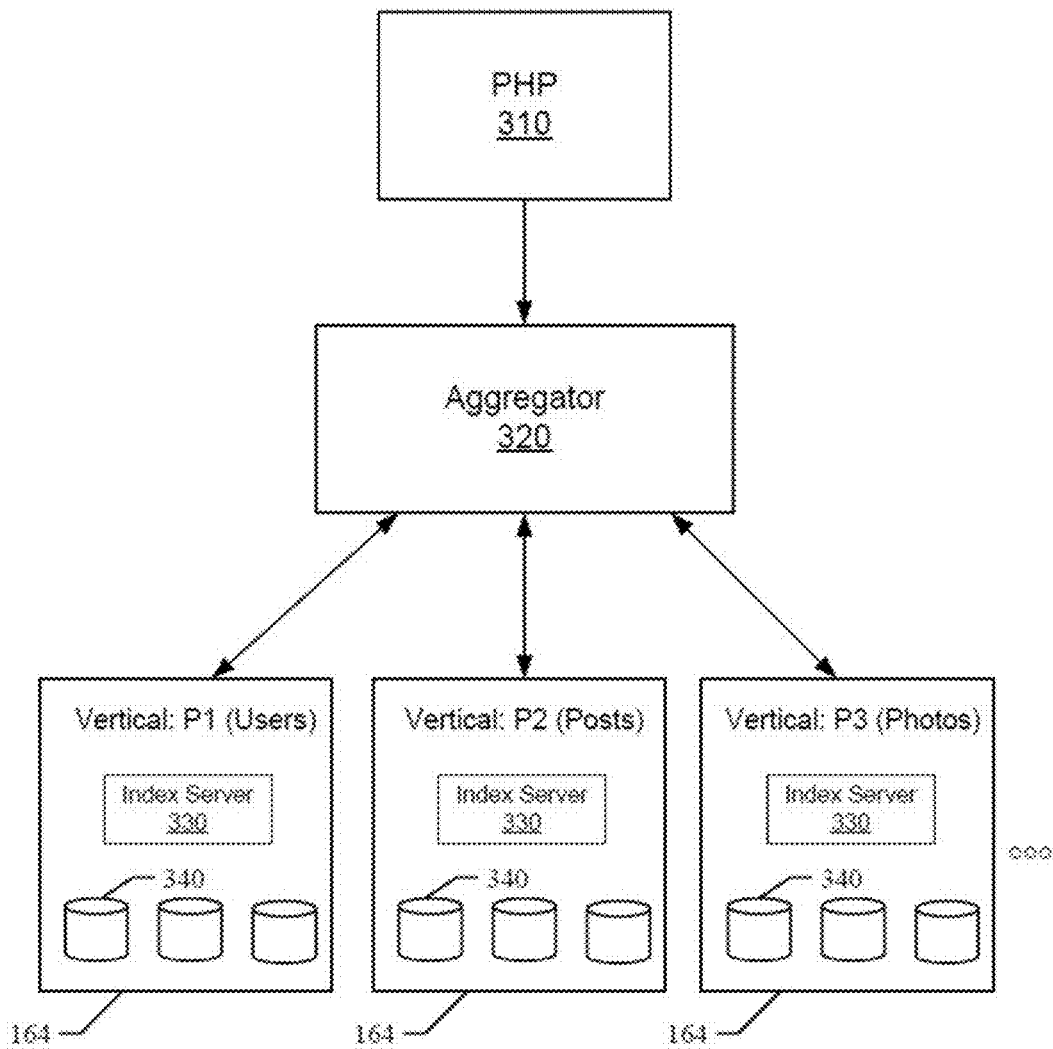
FIG. 3 illustrates an example partitioning for storing objects of the social-networking system.

FIG. 3 illustrates an example partitioning for storing objects of the social-networking system 160. A plurality of data stores 164 (which may also be called "verticals") may store objects of the social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned by based on object-types. Data objects may be stored in a plurality of partitions, each partition holding data objects of a single object-type. In particular embodiments, the social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. The social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a web interface, an application, a location, a user-profile interface, a concept-profile interface, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. The social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. The social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. The social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of the social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, the social-networking system 160 may receive a search query from a PHP (Hypertext Preprocessor) process 310. The PHP process 310 may comprise one or more computing processes hosted by one or more servers 162 of the social-networking system 160. The search query may be a text string or a search query submitted to the PHP process by a user or another process of the social-networking system 160 (or third-party system 170). In particular embodiments, an aggregator 320 may be configured to receive the search query from PHP process 310 and distribute the search query to each vertical. The aggregator may comprise one or more computing processes (or programs) hosted by one or more computing devices (e.g., servers) of the social-networking system 160. Particular embodiments may maintain the plurality of verticals 164 as illustrated in FIG. 3. Each of the verticals 164 may be configured to store a single type of object indexed by a search index as described earlier. In particular embodiments, the aggregator 320 may receive a search request. For example, the aggregator 320 may receive a search request from a PHP (Hypertext Preprocessor) process 210 illustrated in FIG. 2. In particular embodiments, the search request may comprise a text string. The search request may be a structured or substantially unstructured text string submitted by a user via a PHP process. The search request may also be structured or a substantially unstructured text string received from another process of the social-networking system. In particular embodiments, the aggregator 320 may determine one or more search queries based on the received search request (step 303). In particular embodiments, each of the search queries may have a single object type for its expected results (i.e., a single result-type). In particular embodiments, the aggregator 320 may, for each of the search queries, access and retrieve search query results from at least one of the verticals 164, wherein the at least one vertical 164 is configured to store objects of the object type of the search query (i.e., the result-type of the search query). In particular embodiments, the aggregator 320 may aggregate search query results of the respective search queries. For example, the aggregator 320 may submit a search query to a particular vertical and access index server 330 of the vertical, causing index server 330 to return results for the search query.

More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723,861, filed 21 Dec. 2012, and U.S. patent application Ser. No. 13/870,113, filed 25 Apr. 2013, each of which is incorporated by reference.

Suggesting Filters for Search

In particular embodiments, the social-networking system 160 may receive a search query from a first user (i.e., the querying user). The search query may be a text string or any other suitable query means (e.g., an image, an audio file, or other media item). The social-networking system 160 may execute one or more analyses in response to receiving the search query. In particular embodiments, the social-networking system 160 may analyze the search query by executing both a query-analysis process and a results-analysis process, which may be performed in parallel or in any suitable sequence. The query-analysis process may include translating the search query into text and parsing the text to identify one or more n-grams. The query-analysis process may also include calculating one or more confidence-scores for one or more entities (e.g., users of the online social network, concepts) in a set of query-analysis-entities, respectively. Each confidence-score may be based on an analysis of the identified n-grams. The confidence-scores may be based on one or more factors, including the number of identified n-grams from the search query that potentially reference or are otherwise associated with the respective entity. The confidence-scores may also be based on information about the first user and the respective entity (e.g., an affinity between the first user and the respective entity, a degree of separation between the first user and the respective entity). The results-analysis process, which may be an analysis of a set of search results that match the query, may include an initial determination of a set of search results matching the search query. The search results may correspond to one or more objects, respectively. Each of the one or more objects may be associated with one or more entities in a set of results-analysis-entities. The results-analysis process may also include calculating one or more entity-frequencies corresponding to one or more entities in the set of results-analysis-entities, respectively. The calculation may be based on an analysis of a histogram based on the set of search results matching the search query. Each entity-frequency may correspond to a number of occurrences of a respective entity associated with the search results on the histogram. The social-networking system 160 may calculate a filter-score for each entity in a set of prospective-entities based on the respective confidence-score for the entity and the respective entity-frequency of the entity. The set of prospective-entities may include entities from the set of query-analysis-entities and the set of results-analysis-entities (e.g., the entities for which there is a confidence-score greater than a threshold confidence-score and an entity-frequency greater than a threshold entity-frequency). The social-networking system 160 may send, to a client system 130 of the first user, one or more suggested filters. The suggested filters may be filters corresponding to entities having a filter-score greater than a threshold filter-score. The suggested filters may be selectable by the first user. Upon a selection by the first user to modify the set of search results based on the entity corresponding to the suggested filter. Although this disclosure focuses on determining and suggesting filters for search by and on the social-networking system 160, it contemplates determining and suggesting filters for search by and on any suitable search system.

The methods described herein may be used to determine and suggest filters that are effective at narrowing down a set of search results to a smaller subset of search results that may correspond to content that the querying user intended to locate with the search query (or other content that would be of interest to the querying user). In part, the described methods address a common problem associated with search queries: they are often not descriptive enough to identify exactly what the querying user is looking for. Consequently, these search queries often return a large, unwieldy set of search results that has to be manually reviewed by the querying user to locate the intended content. Implementing one or more filters may aid the querying user in narrowing down the set of search results to minimize this manual review process. As an example and not by way of limitation, the querying user may be able to implement a filter that narrows down a set of search results by specifying that only search results corresponding to objects tagged in Hawaii or otherwise associated with the concept "Hawaii" are to be displayed. However, simply presenting every possible filter to the querying user may be overwhelming or at least inconvenient for the querying user, who would need to review all the possible filters to identify the exact filters necessary to locate the intended content. A goal of the methods described herein is the suggestion of effective filters to the querying user. In order to be effective, a filter may need to be directed to narrowing a set of search results based on a predicted search intent of the querying user (e.g., an intent to locate specific content, an intent to locate any content related to a particular user or concept). The filter may also need to be able to reduce the size of the result set by a nontrivial amount (e.g., such that implementation of the filter does not return an identical or substantially identical set of search results following). Suggesting effective filters serves to assist the querying user in easily and efficiently narrowing down a set of search results. Such suggestions may be especially useful in cases where the querying user may not even have thought of using one or more particular suggested filters. As an example and not by way of limitation, the querying user may not have even thought about narrowing the search query or the set of search results to search results associated with "Hawaii" until the suggestion of a filter for "Hawaii." Presenting a set of effective filters that predict the content intended by a search query may serve to improve the querying user experience with search and may generally improve the effectiveness of user searches. The methods described herein also strive to ensure that private or semi-private information (e.g., information that is not visible to at least the querying user) is not inadvertently revealed to the querying user by the presentation of filters. In doing so, the social-networking system 160 may check one or more privacy settings associated with the objects and entities involved.

Figure 4:
FIG. 4 illustrates an example search-results interface following the submission of a search query.

FIG. 4 illustrates an example search-results interface following the submission of a search query. In particular embodiments, the social-networking system 160 may receive a search query from a first user. The search query may have been submitted by a client system 130 of the first user. The search query may be sent in response to an input by the first user that specifies the search query. As an example and not by way of limitation, the first user may have entered a text string in a search field. As another example and not by way of limitation, the first user may have inputted a media item as a search query. A media item may include any suitable media such as an image (e.g., a picture, an emoji), an audio file, a video file. In particular embodiments, the search query may be a combination of text and media (e.g., "hawaii vacation ☺"). In particular embodiments, the search query may be submitted when the first user activates an appropriate interactive element (e.g., a "Search" button) or submits some other suitable input (e.g., pressing an "Enter" key or button) after the entire search query has been entered or otherwise inputted. In particular embodiments, the search query may be submitted automatically as the first user types a text string (e.g., using a typeahead-like process) or inputs a media item without any further input from the first user. In particular embodiments, the search query may be automatically generated and sent by the client system 130 of the first user in response to a trigger event. As an example and not by way of limitation, the client system 130 of the first user may automatically send an appropriate search query related to a particular location when the client system is at the particular location (e.g., automatically sending the search query "history of budapest" or "friends in budapest" when the client system 130 is at Budapest, Hungary for the first time), or another suitable location. As another example and not by way of limitation, the client system of the first user may automatically send an appropriate search query at a particular time of day. For example, the client system may automatically send the search query "news {current date}" at a time when the first user typically wakes up (e.g., submitting the search query "news 2016-06-24" on 24 Jun. 2016 at 7 a.m.). Although this disclosure describes receiving a particular type of query from a particular source in a particular manner, it contemplates receiving any suitable type of query from any suitable source in any suitable manner.

In particular embodiments, the social-networking system 160 may execute one or more analyses in response to receiving the search query to determine one or more entities intended by the search query. In particular embodiments, the social-networking system 160 may analyze the search query by executing both a query-analysis process and a results-analysis process, which may be performed in parallel. In particular embodiments, if the social-networking system 160 executes both the query-analysis process and the results-analysis process, the execution of the results-analysis process may begin along with the query-analysis process, before the query-analysis process, or after the query-analysis process. The results-analysis process and the query-analysis process may occur in parallel for at least some overlap in time, or may occur separately such that there is no overlap.

In particular embodiments, the social-networking system 160 may execute a query-analysis process. The query-analysis process may include parsing the search query to identify one or more n-grams that may be extracted by the social-networking system 160 to perform the query-analysis process. In particular embodiments, the social-networking system 160 may make use of a Natural Language Processing (NLP) analysis to parse through the search query to identify the n-grams. In general, an n-gram may be a contiguous sequence of n items from a given sequence of text. The items may be characters, phonemes, syllables, letters, words, base pairs, prefixes, or other identifiable items from the sequence of text or speech. An n-gram may include one or more characters of text (letters, numbers, punctuation, etc.) in the content of a post or the metadata associated with the post. In particular embodiments, each n-gram may include a character string (e.g., one or more characters of text). In particular embodiments, an n-gram may include more than one word. As an example and not by way of limitation, referencing FIG. 4, the social-networking system 160 may parse some or all of the text of the search query in the search field 410 (e.g., "miami florida vacation . . . ") to identify n-grams that may be extracted. The social-networking system 160 may identify, among others, the following n-grams: miami; florida; miami florida; vacation; florida vacation; miami florida vacation. In particular embodiments, the social-networking system 160 may perform one or more suitable pre-processing steps, such as removing certain numbers and punctuation (including the "#" character in a hashtag), removing or replacing special characters and accents, and/or lower-casing all text. In particular embodiments, the social-networking system 160 may use a term frequency-inverse document frequency (TF-IDF) analysis to remove insignificant terms from the search query. The TF-IDF is a statistical measure used to evaluate how important a term is to a document (e.g., a post on the online social network) in a collection or corpus (e.g., a set of posts on the online social network). The less important a term is in the collection or corpus, the less likely it may be that the term will be extracted as an n-gram. The importance increases proportionally to the number of times a term appears in a particular document, but is offset by the frequency of the term in the corpus of documents. The importance of a term in a particular document is based in part on the term count in a document, which is simply the number of times a given term (e.g., a word) appears in the document. This count may be normalized to prevent a bias towards longer documents (which may have a higher term count regardless of the actual importance of that term in the document) and to give a measure of the importance of the term t within the particular document d. Thus we have the term frequency tf(t,d), defined in the simplest case as the occurrence count of a term in a document. The inverse-document frequency (idf) is a measure of the general importance of the term which is obtained by dividing the total number of documents by the number of documents containing the term, and then taking the logarithm of that quotient. A high weight in TF-IDF is reached by a high term frequency in the given document and a low document frequency of the term in the whole collection of documents; the weights hence tend to filter out common terms. As an example and not by way of limitation, referencing FIG. 4, a TF-IDF analysis of the text of the search query in search field 410 (e.g., "miami florida vacation in april 2011 with daniel") may determine that the n-grams "miami" and "vacation" should be extracted as n-grams, where these terms have high importance within the search query. Similarly, a TF-IDF analysis of the text in the search query may determine that the n-grams "in" and "with" should not be extracted as n-grams, where these terms have a low importance within the search query (e.g., because these are common terms in many posts/comments/messages on the online social network and therefore do not help narrow the set of search results in any significant manner). More information on determining terms of low importance in search queries may be found in U.S. patent application Ser. No. 14/877,624, filed 7 Oct. 2015. Although this disclosure describes executing a query analysis in a particular manner, it contemplates executing any suitable analysis of the search query in any suitable manner.

In particular embodiments, when a search query includes a non-textual portion (e.g., a media item), the social-networking system 160 may translate the search query into one or more n-grams by comparing the non-textual portion to a suitable library (e.g., comparing a media item to a media library). As an example and not by way of limitation, the social-networking system 160 may access a media index that indexes media items with their respective one or more associated n-grams. As another example and not by way of limitation, the social-networking system 160 may access a d-dimensional embedding space that maps media items and n-grams to embeddings (i.e., d-dimensional vector representations) in the d-dimensional embedding space using one or more of the features of the deep-learning model described in U.S. patent application Ser. No. 14/949,436, filed 23 Nov. 2015, which is incorporated by reference. In this example, the embeddings of n-grams may be located near to the embeddings of media items that they are associated with (e.g., based on a frequency of use in communications on the online social network, based on predetermined associations), and the social-networking system 160 may translate a media item to one or more n-grams that are within a threshold distance of the media item. In particular embodiments, the social-networking system 160 may use the deep-learning model to train a media index that may then be accessed by the social-networking system 160 to translate media items to n-grams More information on media indexes and on the use of embedding spaces to translate media items to n-grams may be found in U.S. patent application Ser. No. 14/952,707, filed 25 Nov. 2015. Once a media item has been translated to one or more n-grams, the social-networking system 160 may treat these n-grams just like n-grams that may be identified from the text of a search query. As an example and not by way of limitation, the social-networking system 160 may translate the search query "hawaii ☺ " into "hawaii smile happy" (e.g., having translated the media item " ☺ " into the n-grams "smile" and "happy") and perform the analysis processes described herein as though the search query were "hawaii smile happy."

In particular embodiments, the query-analysis process may include calculating one or more confidence-scores for one or more entities in a set of query-analysis-entities, respectively. The confidence-scores may be based on an analysis of the identified n-grams. An entity may be a user of the online social network or a concept on the online social network (e.g., represented on the social graph 200 by user nodes 202 and concept nodes 204, respectively). As an example and not by way of limitation, referencing FIG. 4, "Daniel A" may be a user-entity and "Florida" may be a concept-entity, and the social-networking system 160 may calculate confidence-scores for both entities. A person who is not a user of the online social network may be a concept-entity. The confidence-score for an entity may represent a probability that one or more of the identified n-grams are intended to reference a respective entity. In determining the confidence-score for an entity, the social-networking system 160 may attempt to identify associations between the entity and the identified n-grams (e.g., using the NLP process). Such an association may be identified based on a determined match between the identified n-grams and one or more keywords (e.g., n-grams) that are associated with an entity. More information on determining matches between n-grams and entities may be found in U.S. patent application Ser. No. 13/556,072, filed 23 Jul. 2012. The social-networking system 160 may find that an n-gram matches an entity based on an index that indexes entities with predetermined associated keywords. More information on the usage of indexes to match n-grams in this manner may be found in U.S. patent application Ser. No. 14/585,782, filed 30 Dec. 2014. The social-networking system 160 may also find that an n-gram matches an entity based on the usage (e.g., in communications on the online social network) of the identified n-grams in connection with the entities. As an example and not by way of limitation, the social-networking system 160 may make use of the deep-learning model described in U.S. patent application Ser. No. 14/949,436, filed 23 Nov. 2015, which is incorporated by reference, to determine that an n-gram is within a threshold proximity of an entity (or keywords associated with the entity). In particular embodiments, the identified n-grams may be associated with an entity based on a shared topic. As an example and not by way of limitation, the n-gram "paris" may be associated with the entity "Eiffel Tower" based on a shared topic. More information on topic association and determining appropriate topics from a set of possible topics may be found in U.S. patent application Ser. No. 14/585,782, filed 30 Dec. 2014 and U.S. patent application Ser. No. 13/167,701, filed 23 Jun. 2011, which is incorporated by reference. Although this disclosure describes calculating a particular type of confidence-score for entities in a particular manner, it contemplates calculating any suitable type of score for any suitable item in any suitable manner.

In particular embodiments, the confidence-score of an entity may be based on the number of identified n-grams that potentially reference or are otherwise associated with the entity (e.g., by matching one or more keywords associated with the entity). As an example and not by way of limitation, in the case of a search query including the text "jane doe vacation," a confidence-score for the user-entity "Jane Doe" may be higher than a confidence-score for the entity "Jane Smith" or "Joey Doe," because there is at least one more n-gram in the search query that directly references "Jane Doe" than the other entities (e.g., "jane" in the case of "Joey Doe," and "doe" in the case of "Jane Smith"). As another example and not by way of limitation, for a search query with the text "hawaii with jason," a confidence-score calculated for the entity "Jason A," who lives in Hawaii, may be higher than a confidence-score calculated for "Jason B," who lives in South Africa. In this example, the n-gram "hawaii" may have been associated with the entity "Jason A," but not with the entity "Jason B" such that there would be more n-grams in the search query that reference Jason A than Jason B.

In particular embodiments, the confidence-score of an entity may be based on an affinity between the first user and the respective entity. As an example and not by way of limitation, for a search query with the text "coffee shop reunion," a confidence-score calculated for the entity "Acme Coffee Shop," for which the first user has a relatively high affinity (e.g., as determined by social graph information from the first user checking in at that location on the online social network, or from the first user "liking" a page related to Acme Coffee Shop), may be higher than a confidence-score calculated for the entity "Java Coffee Shop," for which the first user may have a relatively low affinity. In particular embodiments, the confidence-score of an entity may be based on a degree of separation between the first user and the respective entity on the social graph. As an example and not by way of limitation, in the case of a search query including the text "melissa," a confidence-score calculated for the entity "Melissa A," a first-degree connection of the first user, may be higher than a confidence-score calculated for the entity "Melissa B," a second-degree connection.

In particular embodiments, confidence-scores may be based on information associated with the first user. Confidence-scores may be based on, for example, one or more of a history of past searches performed by the first user, a click history of the first user, a history of the first user's interactions with entities (e.g., posts or photos tagging entities; communications with entities, on or off the online social network), a history of the content accessed or interacted with by the first user, other suitable information associated with the first user, or any combination thereof. As an example and not by way of limitation, for a first user who has a history of many past searches for "justin bieber," a search query for "justin's new tattoo" may result in a higher confidence-score for the entity "Justin Bieber" (a singer) than for the entity "Justin Timberlake" (another singer). As another example and not by way of limitation, for a first user who frequently calls a particular person (e.g., as determined by a telephone-call log, a video-chat log, or other call log on a client system of the first user), the confidence-score for the entity corresponding to the particular person may be higher than for another user whom the first user does not call so frequently. In particular embodiments, confidence-scores may be based on one or more locations associated with the first user. As an example and not by way of limitation, for a first user who is from the town Staines-upon-Thames, England, the confidence-scores for entities corresponding to local business in Staines-upon-Thames may be higher than for entities corresponding to local businesses in Menlo Park, Calif., which is a location with which the first user may not be as closely associated. As another example and not by way of limitation, for a first user whose client system 130 is determined to be at a particular set of coordinates, the confidence-scores for other user entities with client systems 130 that are near the particular set of coordinates may be higher than users that are more distant from the particular set of coordinates. In particular embodiments, confidence-scores may be based on the content that the first user typically engages with. As an example and not by way of limitation, if the first user typically views or interacts with videos on a video-sharing platform, the confidence-scores of entities who are content creators on that video-sharing platform may be higher than entities who are not associated with the video-sharing platform. In particular embodiments, the confidence-scores may be based on the first user's interactions with users or concepts outside the online social network. In particular embodiments, the confidence-scores may be based on information related to current events. As an example and not by way of limitation, the social-networking system 160 may increase confidence-scores of entities that are related to a current trending topic or news event (e.g., increasing the confidence-score of an entity corresponding to a person who lives in China when there has been an earthquake in China, increasing the confidence-score of an entity corresponding to a company that has recently released a new video-game platform). In particular embodiments, the social-networking system 160 may increase confidence-scores of individual entities based on a context associated with a current date or time of the search query. As an example and not by way of limitation, the social-networking system 160 may increase the confidence-score of an entity corresponding to a particular person on the day of the particular person's birthday. As another example and not by way of limitation, the social-networking system 160 may increase the confidence-score of an entity corresponding to a spouse of the first user on the date of their wedding anniversary.

In particular embodiments, the social-networking system 160 may also identify non-entity information within the search query. The social-networking system 160 may use this non-entity information in calculating the confidence-score. As an example and not by way of limitation, in the case of a search query including the text "Sept 23 Thomas," a confidence-score calculated for the entity "Thomas A," whose birthday is September 23 (e.g., as determined by the Thomas A's profile information), may be higher than a confidence-score calculated for the entity "Thomas B," whose birthday is in April. In particular embodiments, the social-networking system 160 may rewrite the search query to make better use of non-entity information. As an example and not by way of limitation, the social-networking system 160 may rewrite a date in a search query into a standardized format that may be used by the social-networking system 160 in indexing content (e.g., changing "april 2011" or "4/2011" to "2011-04-00"). In this example, rewriting the date in the standardized format may make the date more searchable.

In particular embodiments, the social-networking system 160 may execute a results-analysis process, which may be an analysis of a set of search results that match the search query. In particular embodiments, the social-networking system 160 may execute both the query-analysis process and the results-analysis process. If both processes are to be executed, they may be executed in parallel (e.g., at least for some overlap in time), or sequentially in any suitable order. In particular embodiments, the results-analysis process may include an initial determination of a set of search results matching the search query. The social-networking system 160 may identify one or more n-grams of the search query and attempt to match them against one or more indexes of the social-networking system 160 to identify search results (i.e., objects such as posts) that match the one or more n-grams (e.g., by being associated with keywords in the index that match the n-grams). As an example and not by way of limitation, referencing FIG. 3, the social-networking system 160 may pass the search query to the aggregator 320, which may submit the search query to one or more verticals 164 and access their respective index servers 330 (which may index objects of particular object types with one or more associated keywords). In this example, each index server may return a subset of search results that match the search query (e.g., based on one or more n-grams of the search query directly matching the indexed keywords associated with the objects corresponding to the search results, based on n-grams of the search query indirectly matching the indexed keywords through a shared topic), prompting the aggregator 320 to aggregate all the subsets of search results into a single set of search results matching the search query. The result may be a set of search results that match the n-grams of the search query. As an example and not by way of limitation, referencing FIG. 4, the set of search results that match the search query in the search field 410 (e.g., "miami florida vacation in april 2011 with daniel") may have included at least the post 420 (e.g., because it has text associated with keywords that match the n-grams "daniel," "miami," "florida," and "vacation"; because it has an image of a beach in Florida that may be associated with keywords matching the n-grams "florida" and "vacation"; because it was authored in April 2011), the post 430 (e.g., because it has text associated with keywords that match the n-grams "daniel," "miami," and "florida"; because it was authored in April 2011), and the post 440 (e.g., because it has text associated with keywords that match the n-grams "daniel," "miami," and "florida"). The search results in the determined set of search results may correspond to one or more objects (e.g., posts, videos, photos, audio files), respectively. Each of the one or more objects may be associated with one or more entities in a set of results-analysis-entities. As an example and not by way of limitation, referencing FIG. 4, a search result in the set of search results may correspond to the post 440 (i.e., an object), which may be associated with the entities "Jason," "Karina," "Miami," and "Florida," e.g., based at least on the users and concepts mentioned in the post. Although this disclosure describes executing a particular results-analysis process in a particular manner, it contemplates executing any suitable analysis of search results in any suitable manner.

In particular embodiments, the results-analysis process may also include calculating one or more entity-frequencies corresponding to one or more entities in the set of results-analysis-entities, respectively. The calculation may be based on an analysis of a histogram based on the set of search results matching the search query. Each entity-frequency may correspond to a number of occurrences of a respective entity associated with the search results. The entity-frequency may be a relative frequency that may be expressed as a ratio, a rate, a proportion, a percentage, or any other suitable measure that compares the number of occurrences of a particular entity with the number of occurrences of other entities. The histogram may be generated by the social-networking system 160 to describe the occurrences of one or more attributes of the objects corresponding to the set of search results. As an example and not by way of limitation, the histogram may include data regarding the occurrence of attributes of a post (or any other communication), such as n-grams in the textual content of the post (e.g., n-grams associated with entities), names of the users who authored the post, a location (e.g., a location from which the post was authored), a date, a sentiment (e.g., "sad") determined to be associated with the post, a user description of the post (e.g., "eating spaghetti"), topics (e.g., as determined by n-grams in text associated with the post), or other attributes. In particular embodiments, the histogram may also include data regarding the occurrence of concepts determined to be associated with non-textual content (e.g., a media item included in a post). As an example and not by way of limitation, the social-networking system 160 may analyze image- or video-content to recognize persons or concepts therein, as described in U.S. patent application Ser. No. 13/959,446, filed 5 Aug. 2013, and U.S. patent application Ser. No. 14/983,385, filed 29 Dec. 2015, each of which is incorporated by reference. As another example and not by way of limitation, the social-networking system 160 may analyze audio-content using speech- or audio-recognition software to recognize persons or concepts therein. Once the concepts or persons are determined, the social-networking system 160 may translate them into one or more n-grams based on a media index that may leverage one or more of the features of the deep-learning model described in U.S. patent application Ser. No. 14/949,436, filed 23 Nov. 2015, which is incorporated by reference. More information on media indexes in this manner to translate media items to n-grams may be found in U.S. patent application Ser. No. 14/952,707, filed 25 Nov. 2015, and U.S. patent application Ser. No. 15/014,846, filed 3 Feb. 2016, each of which is incorporated by reference. The histogram may include such data on all objects corresponding to the set of search results. Although this disclosure describes calculating a particular type of frequency for entities in a particular manner, it contemplates calculating any suitable type of frequency for any suitable item in any suitable manner.

In analyzing the histogram, the social-networking system 160 may determine a count of occurrences of each attribute in the set of search results. In particular embodiments, the social-networking system 160 may determine a relationship between the attributes and each of the entities identified in the search query, and may equate an occurrence of an attribute with an occurrence of a respective entity. As an example and not by way of limitation, the occurrence of the n-gram "florida" (represented as an attribute on the histogram) in the content of a post may be related to the entity "Florida." In such a case, the social-networking system 160 may count each occurrence of the n-gram "florida" in set of search results as an occurrence of the entity "Florida." Based on the occurrences of these attributes, the social-networking system 160 may determine a total number of occurrences of entities in the set of search results, which may be translated into entity-frequencies for each entity in the set of results-analysis-entities. In some cases, the relationship between an attribute and an entity may be less direct, in which case the social-networking system 160 may not directly equate an occurrence of that attribute with an occurrence of an entity in the set of results. Instead, the social-networking system 160 may count the occurrence of such an attribute as a "partial occurrence" of an entity. As an example and not by way of limitation, the social-networking system 160 may associate an occurrence of the sentiment attribute "Sad" with the entity "Romeo and Juliet" (the Shakespearean tragedy). In this example, the social-networking system 160 may interpret the occurrence of such an attribute as a partial occurrence of the entity "Romeo and Juliet" (e.g., by weighting the occurrence of the entity with a value of 0.1). In particular embodiments, the attributes may be analyzed on a per-object level, such that the social-networking system 160 may identify all entities that are present in each object corresponding to the set of search results based on the attributes of the object. As an example and not by way of limitation, referencing FIG. 4, for the post 420, the social-networking system 160 may identify, among others, the following entities: the user "Thomas," the user "Daniel B," the user "Belal," the concept "Florida," the concept "Vacation," and the concept "Beach" (e.g., based on an image analysis of the included photo). The social-networking system 160 may perform this per-object-level analysis on each object corresponding to the search results, and the histogram may plot the occurrences of entities in each object, rather than occurrences of the attributes of the entire set of search results.

The social-networking system 160 may generate the histogram in any suitable manner based on data about the objects corresponding to the search results. As an example and not by way of limitation, data from the one or more verticals 164 about the attributes of the individual objects corresponding to the respective subsets of search results may be compiled at the aggregator 320 to generate the histogram. In particular embodiments, the social-networking system 160 may analyze multiple histograms to calculate entity-frequencies. As an example and not by way of limitation, a histogram may be generated for each vertical 164 for the respective subset of search results, and the social-networking system 160 may analyze each of the generated histograms separately. In particular embodiments, the set of results-analysis-entities may be the same set of entities as the set of query-analysis-entities considered in the query-analysis process. Alternatively, the set of results-analysis-entities may be a different set of entities (e.g., the entities that comprise each of the sets may have been selected differently based on the respective analysis).

In particular embodiments, the social-networking system 160 may calculate a filter-score for each of one or more entities in a set of prospective-entities. The filter-score may correspond to the effectiveness of a filter. The set of prospective-entities may include entities from the set of query-analysis entities and the set of results-analysis entities. As an example and not by way of limitation, each entity in the set of prospective-entities may be an entity from the set of query-analysis-entities and/or the set of results-analysis-entities for which the social-networking system 160 has calculated a confidence-score greater than a threshold confidence-score and an entity-frequency greater than a threshold entity-frequency. In particular embodiments, the filter-score of an entity may be based on its respective confidence-score and its respective entity-frequency. In particular embodiments, a higher confidence-score may translate to a higher filter-score. Likewise, in particular embodiments, a higher entity-frequency may translate to a higher filter-score. Combining the determinations of multiple analysis processes (e.g., the query-analysis process and the results-analysis process) in arriving at the filter-score may be advantageous because the output of any one analysis may be noisy and/or inaccurate by itself. In particular embodiments, the social-networking system 160 may weight the effect of a filter's confidence-score and entity-frequency in any suitable manner in determining the filter-score. As an example and not by way of limitation, the calculation of the filter-score may be represented, at a high level, by the following equation: filter-score=$Af(\alpha)+Bf(\upsilon)$, where $f(\alpha)$ represents a function of the respective entity's confidence-score, $f(\upsilon)$ represents a function of the respective entity's entity-frequency, and A and B represent weights that may be determined by the social-networking system 160. One or more of the functions for calculating the filter-score may be linear or nonlinear functions acting on the respective confidence-score, the respective entity-frequency, or a combination thereof. The respective weights may be different based on the type of entity for which a filter-score is being calculated. As an example and not by way of limitation, the respective weights may be different when calculating a filter-score for a company-entity than when calculating a filter-score for a person-entity. In particular embodiments, the filter-score for an entity may be increased if the respective entity (or some other entity) paid for or otherwise requested the promotion of the entity. As an example and not by way of limitation, Acme Company may pay to increase the filter-score for the entity "Brawndo," which may correspond to its new electrolyte-based beverage product. Although this disclosure describes calculating a particular type of filter-score for entities in a particular manner, it contemplates calculating any suitable type of score for any suitable item in any suitable manner.

In particular embodiments, a filter-score of an entity may be decreased if the entity has an entity-frequency that exceeds a predetermined maximum entity-frequency (i.e., an entity with a exceedingly high prevalence in the results set), if the filter is to be an AND-filter. As an example and not by way of limitation, the social-networking system 160 may calculate a relatively low filter-score for an entity that occurs in almost all the search results (e.g., exceeding a maximum entity-frequency of 95%). Such a decrease may account for the possibility that such a filter may have limited use to the first user, since applying such an AND-filter to the search results may not be effective in sufficiently narrowing the set of search results (e.g., because 95% of the results set may remain after the filter is applied). In particular embodiments, the converse may be true for NOT-filters. In such cases, the filter-score may be further decreased for entities that have an entity frequency less than a predetermined minimum entity-frequency (i.e., an entity with an exceedingly low prevalence in the results set). As an example and not by way of limitation, the social-networking system 160 may calculate a relatively low filter-score for an entity that occurs rarely occurs in the search results (e.g., less than a minimum entity-frequency of 5%). Such a decrease may account for the fact that applying such a NOT-filter to the search results may not be effective in sufficiently narrowing the set of search results (e.g., because 95% of the results set may remain after the filter is applied).

In particular embodiments, the social-networking system 160 may send, to the client system 130 of the first user, one or more suggested filters. In particular embodiments, the suggested filters may be filters corresponding to entities having a filter-score greater than a threshold filter-score. By virtue of their filter-scores, suggested filters may be filters that are effective in predicting the search intent of the first user and narrowing down a set of search results in a manner that conforms to that predicted search intent. The suggested filters may be displayed in any suitable location on an interface of the online social network. In particular embodiments, the suggested filters may be sent and displayed along with or after an initial set of search results have already been displayed (e.g., on a search-results interface). As an example and not by way of limitation, referencing FIG. 4, suggested filters may be displayed along with an initial set of search results (e.g., including the posts 420, 430, and 440) in the filter-menu 450. In particular embodiments, the suggested filters may be sorted into one or more categories. As an example and not by way of limitation, referencing FIG. 4, the filters appearing in the filter-menu 450 are sorted into three categories (e.g., authorship, location, and date of authorship). The social-networking system 160 may determine what category a filter belongs to based on information associated with the respective entity (e.g., using the NLP analysis or any other suitable process). Such information may exist natively on the social-networking system 160 (e.g., on the social graph 200 as social-graph information), on a public database or encyclopedia, an online dictionary, on third-party websites, on a third-party system 170, or any other suitable information source. As an example and not by way of limitation, the social-networking system 160 may determine that the entity "Florida" should be sorted into the "location" category based on information from any of the above sources. The suggested filters may be displayed inline (i.e., within the search field) or as one or more separate fields (e.g., the option buttons the filter-menu 450, drop-down menu items). More information about the display of filters may be found in U.S. patent application Ser. No. 13/731,910, filed 31 Dec. 2012. In particular embodiments, the filters may be sent and displayed before any search results are displayed (e.g., using a typeahead process that submits search queries as a first user is inputting a search query). As an example and not by way of limitation, as a user types a search query, the social-networking system 160 may display suggested filters following one or more of the analysis processes described herein (and/or any other suitable analysis process), performed with respect to the already entered text and/or with predicted text. In this example, the first user may select the desired filters before the entire search query as intended has even been entered (e.g., suggesting filters in real-time as a typeahead-like suggestion, which may be selected as the first user inputs the search query, as described in U.S. patent application Ser. No. 13/732,101, filed 31 Dec. 2012, which is incorporated by reference). Although this disclosure describes sending particular filters in a particular manner, it contemplates sending any suitable filters in any suitable manner.

In particular embodiments, the suggested filters may be selectable by the first user. Upon a selection by the first user, the filter may be implemented, causing the set of search results to be modified. The set of search results may be modified based on the entities corresponding to the selected suggested filters. In particular embodiments, there may be two types of filters: (1) AND-filters (i.e., filters that function like an AND operator), which filter out all search results that do not include a reference to the corresponding entity; and (2) NOT-filters (i.e., filters that function like a NOT operator), which filter out all search results that include a reference to the corresponding entity. As an example and not by way of limitation, referencing FIG. 4, if the first user selects the suggested filter for the entity "Daniel A" in the filter-menu 450 and if the suggested filter is an AND-filter, the social-networking system 160 may filter out from the set of search results at least the posts 420 and 440 (e.g., because the social-networking system 160 may determine that they do not reference the entity "Daniel A"). By way of a contrasting example and not by way of limitation, building on the previous example, if the suggested filter for the entity "Daniel A" is an AND-filter, the social-networking system 160 may filter out from the set of search results at least the post 430 (e.g., because the social-networking system 160 may determine that the post 430 references the entity "Daniel A"). In particular embodiments, there may be weak-AND filters (e.g., filters function like an AND operator, but that allow the associated entity to be absent from the modified set of search results a specified number of times or percentage of time), strong-OR (e.g., filters that function like an OR operator, but require the associated entity to present in the modified set of search results a specified number of times or percentage of time), and/or weak-NOT filters (e.g., filters that function like an NOT operator, but allow the associated entity to be present in the modified set of search results a specified number of times or percentage of time), which may allow the first user to further tune the search results. In particular embodiments, the social-networking system 160 may also provide filters for modifying the set of search results based on non-entity information identified in the search query. As an example and not by way of limitation, as in FIG. 4, the suggested filters may include a list of dates that may be used to locate communications that were made during specific time periods (e.g., 2016, 2015, 2014, April 2011). In this example, the suggested filter for April 2011 ("Apr 2011") may have been identified in the text of the search query in search field 410, which includes the n-gram "april 2011." Although this disclosure describes modifying the set of search results in a particular manner, it contemplates modifying the set of search results in any suitable manner.

In particular embodiments, the social-networking system 160 may automatically implement one or more suggested filters to a set of search results without a user selection or any other input by the first user. In particular embodiments, such automatic implementation may occur for a suggested filter if the suggested filter has a filter-score greater than an upper-threshold filter-score (which may be a predetermined filter-score greater than the threshold filter-score). As an example and not by way of limitation, for the search query "eiffel tower paris, france," the filter corresponding to the entity "France" may be automatically implemented (e.g., because there may be a high filter-score for that entity at least in part due to a high confidence-score stemming from all the n-grams in the search query being determined to directly or indirectly reference the entity "France"). As another example and not by way of limitation, if the search query includes the text "initrode IT department samir," the filter corresponding to the entity "Initrode" (corresponding to a software company) may be automatically implemented by the social-networking system 160 (e.g., stemming from at least a high entity-frequency for the entity "Initrode"). In particular embodiments, automatic implementation of a filter may result in the initial set of search results presented to the first user being a modified set of search results (i.e., a set that has been narrowed down based on the automatically implemented filter). In particular embodiments, the first user may submit an input to remove any of the automatically implemented filters at any time. In particular embodiments, the social-networking system 160 may stop short of implementing suggested filters in the cases described immediately above (e.g., filters with an upper-threshold filter-score) and may instead pre-select the filters for the first user (e.g., by selecting an option button) and wait until the first user submits an input approving the filters (e.g., an input selecting an "Apply Filters" button). In such an embodiment, the initial set of search results may be unmodified until the first user submits the input approving the filter. The automatic implementation or the pre-selection of filters may increase user convenience and may be advantageous at least in cases where there may be large initial set of search results matching the search query (e.g., because such a large set may be particularly overwhelming to the first user).

In particular embodiments, in order for a filter to be a suggested filter, it may need to additionally pass one or more privacy checks to ensure that private or semi-private information (e.g., information that is not visible to at least the querying user) is not inadvertently disclosed when the filter is displayed (e.g., a display of a filter for an entity might imply that the entity is somehow associated with the subject of the search query). In these embodiments, for the purpose of this disclosure, filters that have a filter-score greater than the threshold filter-score but have not yet passed the privacy checks may be termed "potential filters." Once potential filters pass the privacy checks, they may be promoted to suggested-filter status (i.e., they may become suggested filters) and may be sent to the client system of the first user as described herein. Each item of information on the social-networking system 160 may include privacy data in the form of privacy settings (which may be explicitly or implicitly specified by an associated user, or by the social-networking system 160 by default) that specifies whether or not a querying user (e.g., the first user) may view that item of information. In particular embodiments, in the context of the social graph 200, each node and each edge connecting the nodes may have associated privacy settings. The privacy-check process may use this privacy data to determine whether displaying a potential filter might disclose private or semi-private information to the first user. In particular embodiments, the privacy-check process may include an object-level privacy check, which may determine whether a potential filter is directed to a search result corresponding to an object that is not visible to the first user. In the context of the social graph 200, an object may not be visible to the first user if its corresponding node has privacy settings specifying that this is so. Potential filters that are directed to such search results may fail the object-level privacy check and may consequently not be promoted to suggested-filter status. As an example and not by way of limitation, a person-entity "David X" may have authored certain private posts that match the first user's query but are visible only to first-degree connections of David X. If the first user is not a first-degree connection of David X, the social-networking system 160 may prevent the display of any filters that are directed to those private posts (e.g., a filter referencing David X, a filter that alludes to content from those posts, a filter that may bias toward displaying the private posts and tend to eliminate objects other than the private posts). In particular embodiments, potential filters that are directed to an object that is not visible to the first user but also directed to an object that is visible to the first user may still pass the object-level privacy check. Although this disclosure describes executing particular types of privacy checks in a particular manner, it contemplates executing any suitable privacy checks in any suitable manner.

In particular embodiments, the privacy-check process may include an edge privacy check, which may determine whether a potential filter corresponds to an entity that is associated with the objects corresponding to the set of search results based on information that is not visible to the first user. In the context of the social graph 200, an entity may be associated with a search query in this manner if its corresponding node is connected to (i.e., matches) the objects in part by an edge 206 whose privacy settings specify that it is not visible to the first user. In performing an edge privacy check, the social-networking system 160 may access the social graph 200 and check the privacy settings of each edge 206 on the one or more paths that connect an entity to each object. If the privacy settings of an edge 206 specify that the edge 206 is not visible to the first user, the social-networking system 160 may remove filters that allude to that edge 206 and/or the respective entity. This process may be performed for each entity corresponding to a potential filter. As an example and not by way of limitation, a user-entity "David Y" may have "liked" the official Justin Bieber fan page on the online social network, but may have made that "like" private such that it would not be visible to the first user (i.e., specifying privacy settings for the "like" edge 206 between the node for the Justin Bieber fan page and the user node 202 for the entity "David Y" such that it is not visible to the first user). In this example, if the first user searches for "justin bieber david," the social-networking system 160 may prevent the display of a filter that references the entity "David Y" even though there may be a high filter-score for the entity "David Y" (e.g., because the user David Y may be associated with the set of search results based on information that is not visible to the first user). In particular embodiments, a potential filter corresponding to an entity that is associated with the objects corresponding to the set of search results based on information that is not visible to the first user may still pass the edge privacy check if the potential filter can still be associated with the set of search results based on information that is visible to the first user. In doing so, for each object associated with a search result, the social-networking system 160 may look for one or more privacy-visible path between an entity and the object (i.e., a path that connects the entity with the object using only edges that are visible to the first user). In such cases, in particular embodiments, the potential filter may only be promoted to suggested-filter status if its corresponding entity is able to achieve a filter-score greater than the threshold filter-score even when the non-visible edge is not considered by the social-networking system 160. As an example and not by way of limitation, in a search for "justin bieber david," the potential filter for the entity "David Y" may be promoted to suggested-filter status if the entity "David Y" has a filter-score greater than the threshold filter-score (e.g., because David Y has made numerous posts on the online social network that reference Justin Bieber) even if the social-networking system 160 does not consider the fact that the user David Y liked the official Justin Bieber fan page. More information on finding privacy-visible paths, edge privacy checks, and object-level privacy checks may be found in U.S. patent application Ser. No. 13/556,017, filed 23 Jul. 2012, which is incorporated by reference.

In particular embodiments, the social-networking system 160 may adjust the filter-score of an entity downward in response to an indication of a preference by the entity to make an association with another entity private. As an example and not by way of limitation, building on the previous example, the filter-score for the entity "David Y" may be adjusted downward for the search query "justin bieber david" precisely because David Y indicated a preference to make an association with the entity "Justin Bieber" (e.g., the liking of the official Justin Bieber fan page) private. This may be because based on the user David Y's decision to make the "like" private, it may be likely that the user David Y prefers not to be associated with the entity "Justin Bieber."

Privacy checks, particularly edge-privacy checks, may be resource intensive. As such, in particular embodiments, the social-networking system 160 may conserve resources by performing privacy checks only on items (e.g., edges and nodes) that are determined to be likely to contain sensitive information (e.g., information that users typically specify to be private). Such a determination may be based on one or more predetermined principles or principles derived from accumulated data on user behaviors (e.g., using a machine-learning algorithm that considers the type of edges and nodes that users frequently specify as private). As an example and not by way of limitation, the social-networking system 160 may determine that edges describing dates tend not to contain sensitive information (e.g., because users may not frequently specify such information as being private), and may not therefore check the privacy settings of such edges. By way of a contrasting example and not by way of limitation, the social-networking system 160 may check the privacy settings of edges that describe relationships, authorship, likes, affinities, or other information that may tend to include sensitive information.

Figure 5:
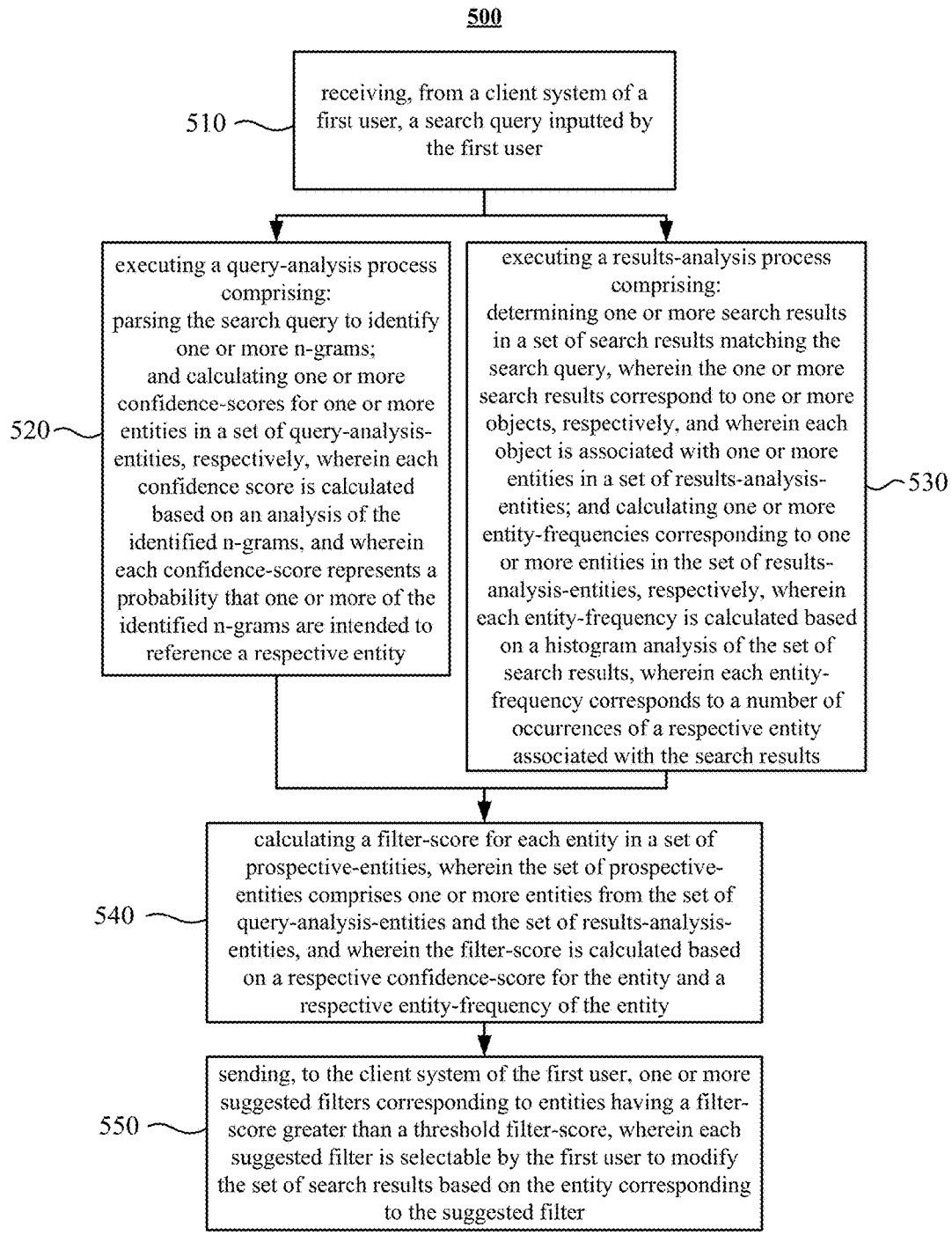
FIG. 5 illustrates an example method 500 for suggesting filters for search queries.

FIG. 5 illustrates an example method 500 for suggesting filters for search queries. The method may begin at step 510, where the social-networking system 160 may receive, from a client system of a first user, a search query inputted by the first user. At step 520, the social-networking system 160 may execute a query-analysis process comprising: parsing the search query to identify one or more n-grams; and calculating one or more confidence-scores for one or more entities in a set of query-analysis-entities, respectively, wherein each confidence score is calculated based on an analysis of the identified n-grams, and wherein each confidence-score represents a probability that one or more of the identified n-grams are intended to reference a respective entity. At step 530, the social-networking system 160 may execute a results-analysis process comprising: determining one or more search results in a set of search results matching the search query, wherein the one or more search results correspond to one or more objects, respectively, and wherein each object is associated with one or more entities in a set of results-analysis-entities; and calculating one or more entity-frequencies corresponding to one or more entities in the set of results-analysis-entities, respectively, wherein each entity-frequency is calculated based on a histogram analysis of the set of search results, wherein each entity-frequency corresponds to a number of occurrences of a respective entity associated with the search results. At step 540, the social-networking system 160 may calculate a filter-score for each entity in a set of prospective-entities, wherein the set of prospective-entities comprises one or more entities from the set of query-analysis-entities and the set of results-analysis-entities, and wherein the filter-score is calculated based on a respective confidence-score for the entity and a respective entity-frequency of the entity. At step 550, the social-networking system 160 may send, to the client system of the first user, one or more suggested filters corresponding to entities having a filter-score greater than a threshold filter-score, wherein each suggested filter is selectable by the first user to modify the set of search results based on the entity corresponding to the suggested filter. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for suggesting filters for search queries including the particular steps of the method of FIG. 5, this disclosure contemplates any suitable method for suggesting filters for search queries including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web interfaces, in one or more e-mails, or in connection with search results requested by a user. In addition or as an alternative, an advertisement may be one or more sponsored stories (e.g., a news-feed or ticker item on the social-networking system 160). A sponsored story may be a social action by a user (such as "liking" an interface, "liking" or commenting on a post on an interface, RSVPing to an event associated with an interface, voting on a question posted on an interface, checking in to a place, using an application or playing a game, or "liking" or sharing a website) that an advertiser promotes, for example, by having the social action presented within a predetermined area of a profile interface of a user or other interface, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results interface, where sponsored content is promoted over non-sponsored content.

In particular embodiments, an advertisement may be requested for display within social-networking-system web interfaces, third-party web interfaces, or other interfaces. An advertisement may be displayed in a dedicated portion of an interface, such as in a banner area at the top of the interface, in a column at the side of the interface, in a GUI within the interface, in a pop-up window, in a drop-down menu, in an input field of the interface, over the top of content of the interface, or elsewhere with respect to the interface. In addition or as an alternative, an advertisement may be displayed within an application. An advertisement may be displayed within dedicated interfaces, requiring the user to interact with or watch the advertisement before the user may access an interface or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) an interface associated with the advertisement. At the interface associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through the social-networking system 160) or RSVP (e.g., through the social-networking system 160) to an event associated with the advertisement. In addition or as an alternative, an advertisement may include social-networking-system content directed to the user. As an example and not by way of limitation, an advertisement may display information about a friend of the user within the social-networking system 160 who has taken an action associated with the subject matter of the advertisement.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile interface that identify a set of users that may access the work experience information on the user-profile interface, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 6:
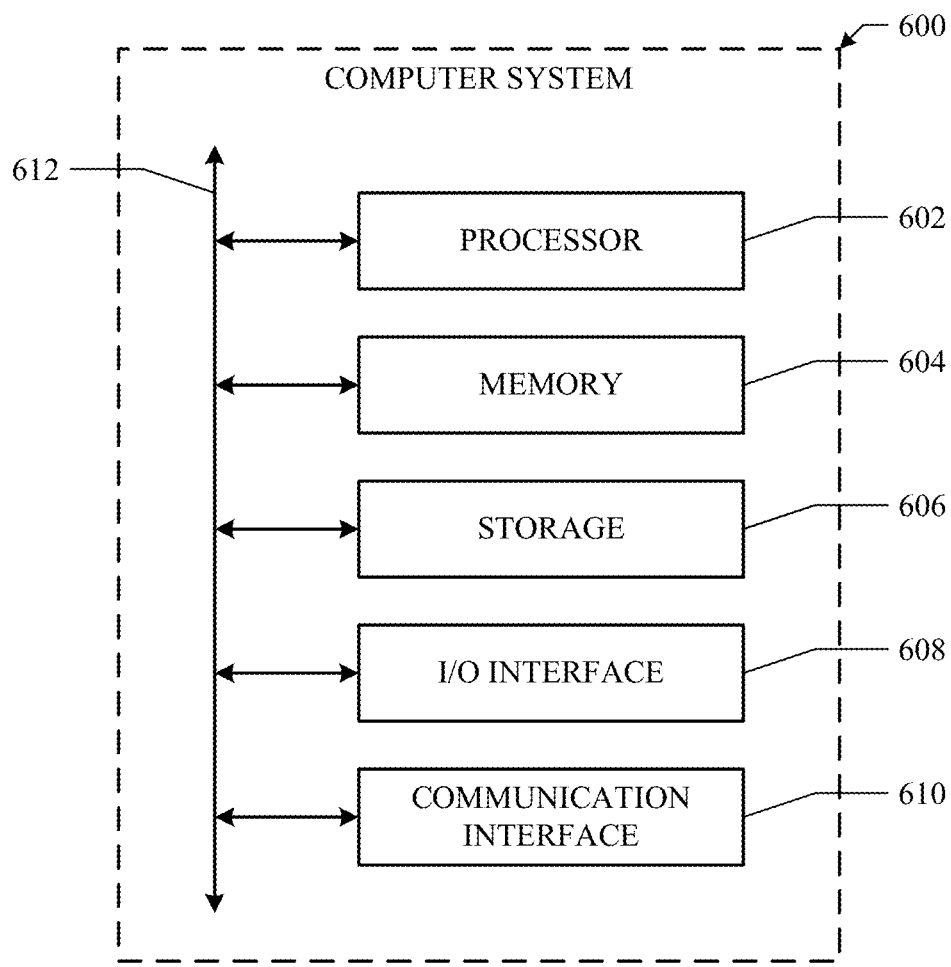
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
   receiving, from a client system of a first user, a search query inputted by the first user;
   executing a query-analysis process, wherein the query-analysis process comprises:
      parsing the search query to identify one or more n-grams, and
      calculating one or more confidence-scores for one or more entities in a set of query-analysis-entities, respectively, wherein each confidence score is calculated based on an analysis of the identified n-grams, and wherein each confidence-score represents a probability that one or more of the identified n-grams are intended to reference a respective entity;
   executing a results-analysis process, wherein the results-analysis process comprises:
      determining one or more search results in a set of search results matching the search query, wherein the one or more search results correspond to one or more objects, respectively, and wherein each object is associated with one or more entities in a set of results-analysis-entities, and
      calculating one or more entity-frequencies corresponding to one or more entities in the set of results-analysis-entities, respectively, wherein each entity-frequency is calculated based on a histogram analysis of the set of search results, wherein each entity-frequency corresponds to a number of occurrences of a respective entity associated with the search results;
   calculating a filter-score for each entity in a set of prospective-entities, wherein the set of prospective-entities comprises one or more entities from the set of query-analysis-entities and the set of results-analysis-entities, and wherein the filter-score is calculated based on a respective confidence-score for the entity and a respective entity-frequency of the entity; and
   sending, to the client system of the first user, one or more suggested filters corresponding to entities having a filter-score greater than a threshold filter-score, wherein each suggested filter is selectable by the first user to modify the set of search results based on the entity corresponding to the suggested filter.

2. The method of claim 1, wherein each of the one or more entities in the set of prospective-entities have a confidence-score greater than a threshold confidence-score and an entity-frequency greater than a threshold entity-frequency.

3. The method of claim 1, further comprising:
   accessing a social graph comprising a plurality of nodes and a plurality of edges connecting the nodes, each of the edges between two of the nodes representing a single degree of separation between them, the nodes comprising:
      a first node representing the first user, the first user being associated with an online social network, and
      a plurality of second nodes representing a plurality of entities, respectively, wherein each entity corresponds to a concept or a second user associated with the online social network.

4. The method of claim 3, wherein the confidence-score for each entity is further based on a degree of separation between the first node and a second node representing the entity.

5. The method of claim 1, wherein the confidence-score for each entity is further based on a number of entity-matches associated with the entity, wherein the number of entity-matches is determined, at least in part, by:
   associating one or more identified n-grams with the entity based on the identified n-gram matching a keyword associated with the entity; and
   determining a total number of the one or more identified n-grams that are associated with the entity.

6. The method of claim 1, wherein the confidence-score for each entity is further based on an affinity between the first user and the entity.

7. The method of claim 1, wherein the confidence-score for each entity is further based on context information associated with the entity and a current context.

8. The method of claim 1, wherein the confidence-score for each entity is further based on a location associated with the client system of first user and a location associated with the entity.

9. The method of claim 1, wherein the results-analysis process further comprises:
   generating a histogram comprising a count of occurrences of one or more attributes of the objects corresponding to the search results in the set of search results;
   determining a relationship between the one or more attributes and the one or more entities in the set of results-analysis-entities; and
   calculating, for each entity in the set of results-analysis-entities, a count of occurrences of the entity based on the respective count of one or more of the attributes that are determined to be related to the entity.

10. The method of claim 1, further comprising:
    receiving an input from the user selecting one or more of the suggested filters; and
    implementing the selected one or more filters by modifying the set of search results, wherein the modifying comprises removing all search results that do not match the entities corresponding to the respective selected filters.

11. The method of claim 1, further comprising:
    receiving an input from the user selecting one or more of the suggested filters; and
    implementing the selected one or more filters by modifying the set of search results, wherein the modifying comprises removing all search results that match the entities corresponding to the respective selected filters.

12. The method of claim 1, further comprising automatically implementing one or more of the suggested filters without additional input from the first user.

13. The method of claim 12, wherein the one or more of the suggested filters that are automatically implemented are suggested filters corresponding to entities having a filter-score greater than a upper-threshold filter-score.

14. The method of claim 12, wherein the one or more of the suggested filters are automatically implemented when there is greater than a threshold number of search results matching the search query.

15. The method of claim 1, further comprising:
    executing a privacy-check process on one or more potential filters corresponding to entities having a filter-score greater than a threshold filter-score, wherein the privacy-check process determines, for each of the potential filters, whether sending the respective potential filters would disclose information not visible to the first user based on privacy settings associated with the respective entity; and
    determining, from the one or more potential filters, the one or more suggested filters based on the privacy-check process.

16. The method of claim 15, wherein the privacy-check process further comprises, for each potential filter, determining whether the potential filter is directed to a search result corresponding to an object that is not visible to the first user based on privacy settings associated with the object.

17. The method of claim 15, wherein the privacy-check process further comprises, for each filter, determining whether the potential filter corresponds to an entity that is associated with the set of search results based on information that is not visible to the first user based on privacy settings associated with the object.

18. The method of claim 1, wherein the set of query-analysis-entities is the same as the set of results-analysis-entities.

19. One or more computer-readable non-transitory storage media embodying software that is operable when executed to:
   receive, from a client system of a first user, a search query inputted by the first user;
   execute a query-analysis process, wherein the query-analysis process comprises:
      parsing the search query to identify one or more n-grams, and
      calculating one or more confidence-scores for one or more entities in a set of query-analysis-entities based on an analysis of the identified n-grams, wherein each confidence-score represents a probability that one or more of the identified n-grams are intended to reference a respective entity;
   execute a results-analysis process, wherein the results-analysis process comprises:
      determining a set of search results matching the search query, and
      calculating one or more entity-frequencies corresponding to one or more entities in a set of results-analysis-entities based on a histogram analysis of the set of search results, wherein each entity-frequency corresponds to a number of occurrences of a respective entity associated with the search results;
   calculate a filter-score for each entity in the set of query-analysis-entities and the set of results-analysis-entities based on its respective confidence-score and its respective entity-frequency; and
   send, to the client system of the first user, one or more suggested filters corresponding to entities having a filter-score greater than a threshold filter-score, wherein each suggested filter is selectable by the first user to modify the set of search result based on the entity corresponding to the suggested filter.

20. A system comprising: one or more processors; and a non-transitory memory coupled to the processors comprising instructions executable by the processors, the processors operable when executing the instructions to:
   receive, from a client system of a first user, a search query inputted by the first user;
   execute a query-analysis process, wherein the query-analysis process comprises:
      parsing the search query to identify one or more n-grams, and
      calculating one or more confidence-scores for one or more entities in a set of query-analysis-entities based on an analysis of the identified n-grams, wherein each confidence-score represents a probability that one or more of the identified n-grams are intended to reference a respective entity;
   execute a results-analysis process, wherein the results-analysis process comprises:
      determining a set of search results matching the search query, and
      calculating one or more entity-frequencies corresponding to one or more entities in a set of results-analysis-entities based on a histogram analysis of the set of search results, wherein each entity-frequency corresponds to a number of occurrences of a respective entity associated with the search results;
   calculate a filter-score for each entity in the set of query-analysis-entities and the set of results-analysis-entities based on its respective confidence-score and its respective entity-frequency; and
   send, to the client system of the first user, one or more suggested filters corresponding to entities having a filter-score greater than a threshold filter-score, wherein each suggested filter is selectable by the first user to modify the set of search result based on the entity corresponding to the suggested filter.

* * * * *